United States Patent [19]
Rydberg

[11] 3,751,904
[45] Aug. 14, 1973

[54] HEAT ENGINES
[76] Inventor: Sigge Rydberg, Konstgjutarvagen 24, Johanneshov, Sweden
[22] Filed: Sept. 23, 1971
[21] Appl. No.: 183,210

[30] Foreign Application Priority Data
Sept. 25, 1970 Sweden.............................. 13082/70

[52] U.S. Cl. .................................................... 60/24
[51] Int. Cl. ................................................. F02g 1/04
[58] Field of Search ......................................... 60/24

[56] References Cited
UNITED STATES PATENTS
| | | | |
|---|---|---|---|
| 2,484,392 | 10/1949 | Heeckeren.......................... | 60/24 X |
| 2,616,245 | 11/1952 | Weenen................................. | 60/24 |
| 3,183,662 | 5/1965 | Korsgren.............................. | 60/24 |
| 3,200,602 | 8/1965 | Dros .................................... | 60/24 X |

*Primary Examiner*—Martin P. Schwadron
*Assistant Examiner*—Allen M. Ostrager
*Attorney*—Woodhams, Blanchard & Flynn

[57] ABSTRACT

A gas operated heat engine or heat pump having a master cylinder and an auxiliary cylinder and respectively a master piston and an auxiliary piston. Connecting lines are arranged between the cylinders such that the gas circulates in a system having a gas heater and a gas cooler. The master cylinder has a larger stroke volume than the associated auxiliary cylinder. During a working phase, the upper auxiliary cylinder chamber communicates, via the gas heater, with the upper master cylinder chamber. At the same time, the lower master cylinder chamber communicates, via the gas cooler, with the lower auxiliary cylinder chamber. During a heat-exchange phase of the master cylinder, immediately after the working phase, the upper chamber in the master cylinder communicates, via a first side of a heat exchanger, with the lower chamber in the master cylinder, while at the same time the lower chamber in the master cylinder communicates, via a second side of said heat exchanger, with the upper auxiliary cylinder chamber.

14 Claims, 6 Drawing Figures

Patented Aug. 14, 1973

HEAT ENGINES

The present invention relates to an improvement in heat engines and more specifically to hot-gas engines (air engines).

The advantages obtained with a hot-gas engine lie in the possibility of using low-grade fuels at slow continuous combustion rates (deflagration), thereby totally, or practically totally eliminating the presence of residual products harmful to the environment while rendering a high thermodynamic efficiency possible. Its limitations on the other hand, reside in the difficulty to produce, by means of thermodynamically and technically conceivable constructions mean pressures which even remotely compare with the internal combustion engine. The requirement of a high mean pressure renders open systems less favourable. The working gas should be contained in a closed system and circulated therethrough at a high rate of speed, the gas being alternately cooled and, during one phase of the circuit, delivers a maximum external work in a master cylinder. In addition to the desirability of a high mean pressure in order to obtain low engine weight in relation to the rated power of the engine, it is necessary, in order to obtain a maximum thermodynamic efficiency, to arrange the circuitary path of the gas in a manner such that the useful work in relation to the quantity of gas and heat energy supplied is a maximum, i.e., in a manner such that the heat losses are as low as possible.

The modern version of the Sterling motor fulfills these requirements and at the same time presents a relatively reliable and refined solution to a number of purely technical problems; for example seals for the enclosed working gas, the arrangement of master cylinders and master pistons actuated by solely cooled gas, complete equilibration of the movable parts etc. On the other hand, the pistons, i.e., the master piston and the auxiliary piston, which move towards each other, require technically complicated arrangement, for example a Philips rhombic crank mechanism, which must be considered to complicate the construction. The working gas in the Sterling motor describes, purely thermodynamically, a circuit during each working cycle, but does not circulate in the system in the actual meaning of the word. Consequently the engine can operate without valves. The present invention relates to a heat engine in which a sealed quantity of gas is preferably enclosed, the gas circulating in the closed system of the engine and progressively undergoing a series of changes in state in a manner to produce a working diagram having a maximum area. In accordance with the invention, the engine is provided with valves and, for the purpose of obtaining the highest thermodynamic efficiency, a heat exchanger is arranged to transfer a maximum portion of the internal energy of the working gas after expansion in the master cylinder to the portion of the gas which is to be reheated for the subsequent working cycle. In accordance with an alternative embodiment of the engine, during a heat exchange phase of a master cylinder immediately after the gas has passed the heat exchanger, the working gas is passed through a cooling zone before being forced through a cooler by the action of a master piston. At the same time, the gas is heated immediately after it has passed in counter-current through the heat exchanger and absorbed heat therefrom. By means of this arrangement, it is possible to improve further the thermodynamic efficiency of the engine. From the point of view of construction the engine is simple; it can be constructed for low power outputs, but is preferably intended for high power cycles and can be driven with simple, low-grade fuels and at such low temperatures that solar energy, for example, can be used.

With regard to its mode of operation, the hot-gas engine of the present invention approaches a Carnot-cycle more closely than previously known constructions.

The invention is mainly characterized in that the master cylinder in each pair of cylinders has a larger stroke volume than associated auxiliary cylinders, and that during a working phase an upper auxiliary cylinder chamber in the auxiliary cylinder communicates, via the gas heater, with an upper master cylinder chamber in the master cylinder, at the same time as a lower master cylinder chamber in the master cylinder communicates via the gas cooler, with a lower auxiliary cylinder chamber in the auxiliary cylinder, and that during a heat-exchange phase of the master cylinder, immediately after the working phase, the upper chamber in the master cylinder communicates, via a first side of a heat exchanger, with the lower chamber in the master cylinder, while at the same time the lower chamber in the master cylinder communicates, via a second side of said heat exchanger, with the upper auxiliary cylinder chamber in the auxiliary cylinder.

The invention will now be described with reference to three embodiments illustrated in the accompanying drawings, in which.

Figure 1:
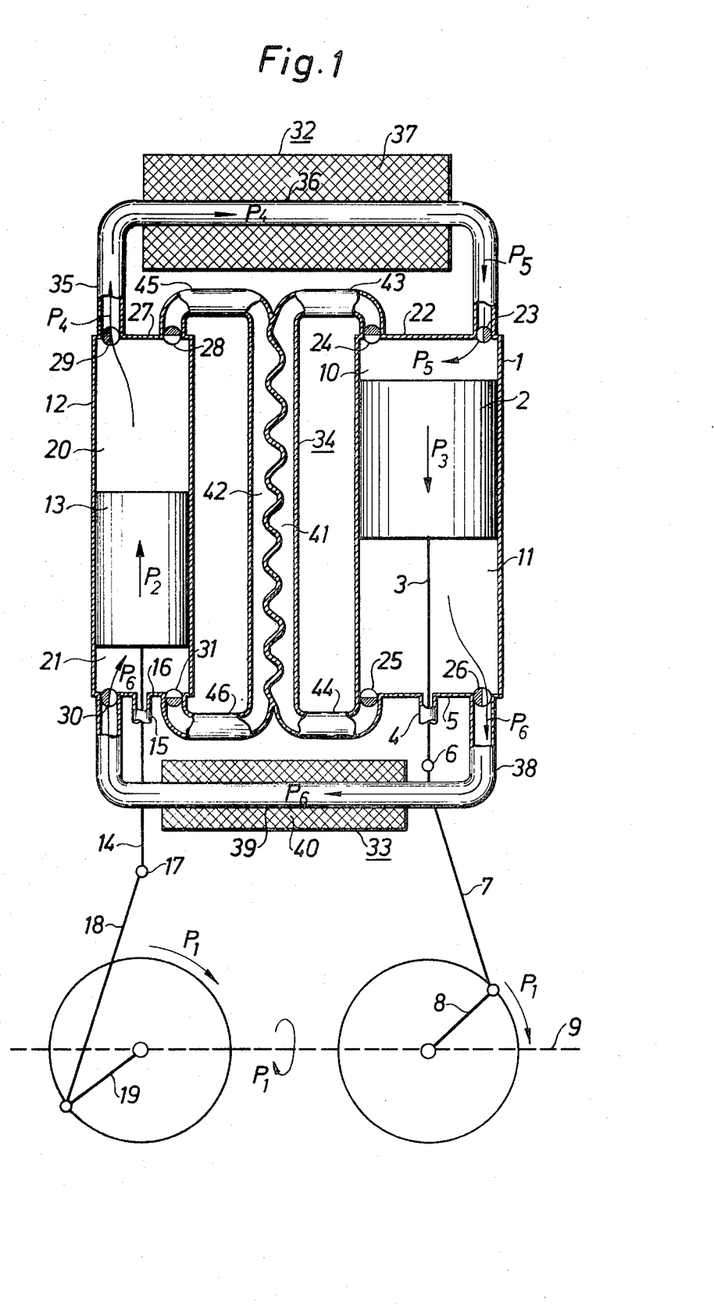
FIG. 1 illustrates diagrammatically a section of the heat engine according to the invention in an arrangement having a double-acting master cylinder provided with a master piston, and a double-acting auxiliary cylinder provided with an auxiliary piston, the shown piston positions and piston movements being those occupied and executed during a working phase of the engine.
Figure 2:
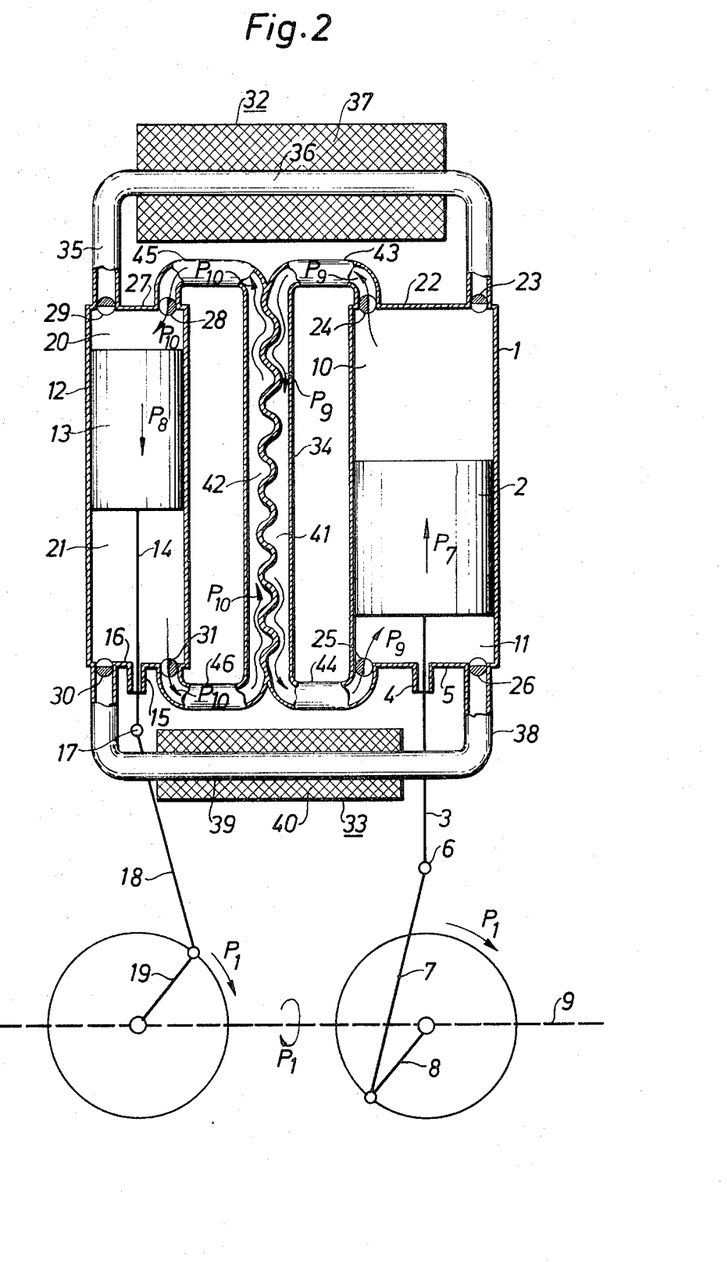
FIG. 2 illustrates diagrammatically a heat-exchange phase of the engine illustrated in FIG. 1.
Figure 3:
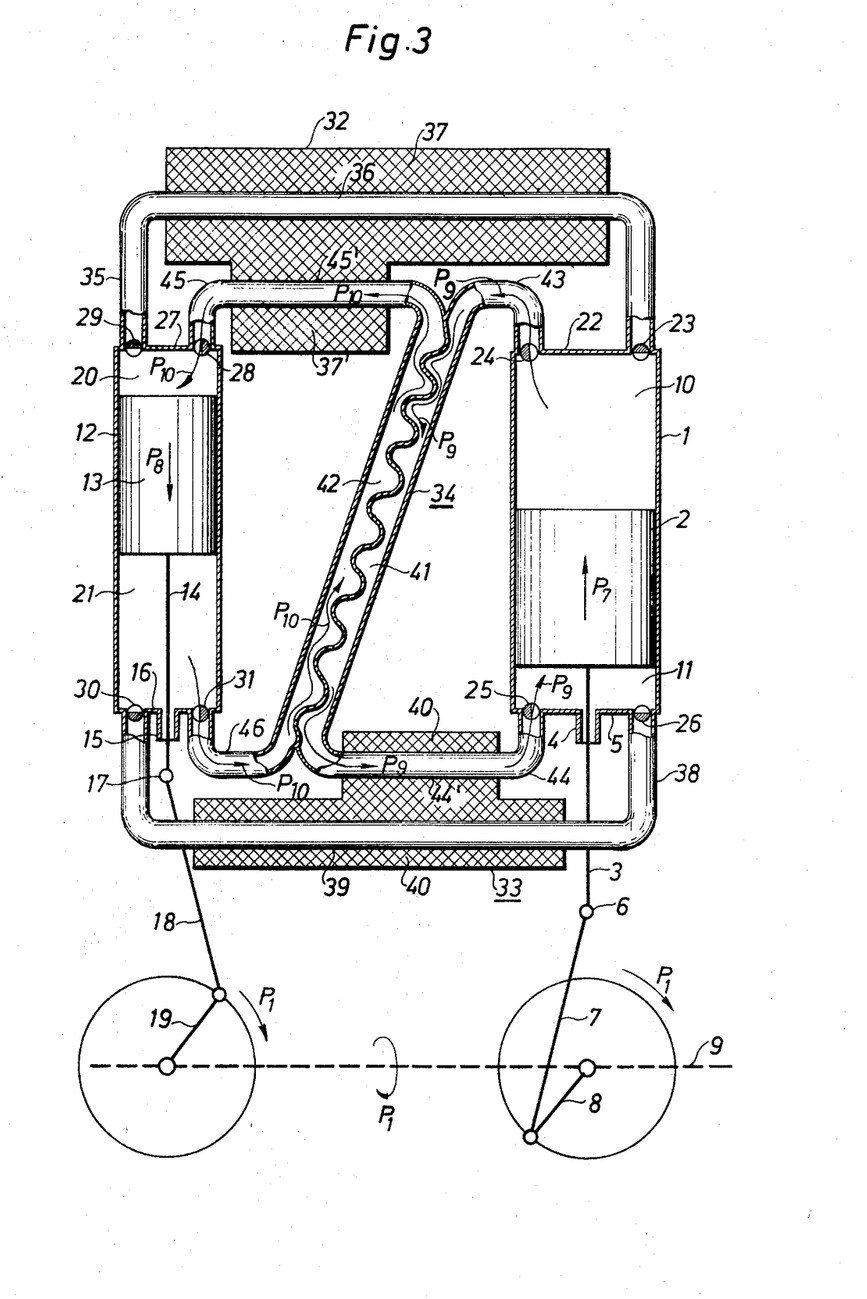
FIG. 3 illustrates diagrammatically and in section an embodiment of the engine shown in FIG. 1 and 2 and illustrates a heat-exchange phase and shows means for extra cooling and extra heating of the quantities of gas passing in counter-current through a heat exchanger.

With reference to the embodiments illustrated in FIGS. 1,2 and 3, there is arranged in a double-acting master cylinder 1 a piston 2 having a piston rod 3 which sealingly passes through a packing box 4 in an end wall 5 of the master cylinder 1. Attached to the free end of the piston rod 3 via a pivot 6 is a connecting rod 7, which is pivotally connected to a crank elbow 8 of a crankshaft 9. As the crankshaft 9 rotates, the piston 2 executes a reciprocatory movement in the master cylinder 1 and during this movement defines two chambers, an upper master cylinder chamber 10 and a lower master cylinder chamber 11, the volume of the chambers varying according to the position of the piston.

Similarly, there is arranged in an auxiliary cylinder 12 a piston 13 having a piston rod 14 which passes sealingly through a packing box 15 in a lower cylinder wall 16 of the cylinder 12. The piston rod 14 is connected to a second crank elbow 19 of the crank shaft 9 via a pivot 17 and a connecting rod 18. As will be seen from FIG. 1 and FIG. 4, the two crank elbows 8 and 19 are displaced angularly with respect to each other through 180°. When the crankshaft 9 rotates, the piston 13 executes a reciprocatory movement in the auxiliary cylinder 12 and defines an upper auxiliary cylinder chamber 20 and a lower auxiliary cylinder chamber 21, the volume of the chambers varying with the position of the piston in the cylinder. For reasons which will be clear from the following, the master cylinder 1 and the piston 2 have a larger diameter, and therewith a larger area, than the auxiliary cylinder 12 and the piston 13.

Arranged in an upper cylinder wall 22 of the master cylinder 1 are two valves 23, 24, and arranged in the lower cylinder wall 5 in a corresponding manner are two valves 25, 26. Similarly, two valves 28, 29 are arranged in an upper wall 27 of the auxiliary cylinder 12 and two valves 30, 31 are arranged in the lower wall 16 of the cylinder 12. For the sake of simplicity, it is assumed in the following that the valves 23-26, 28-31 are positively controlled by mechanisms not shown in the drawing, the mechanisms being connected to the crankshaft 9 in a manner such that the valves are positioned either in a fully closed or a fully open position at predetermined moments of time synchronously with the movement of the crankshaft 9. As will be hereinafter described, however, certain valves may be arranged in a manner such that they are opened and closed solely by the pressure of the working gas, or in response to the pressure difference in respective cylinder chambers.

Arranged in direct connection with the valves 23-26, 28-31 is a system of conduits for conveying the working gas through a gas heater, generally indicated by the reference numeral 32, a gas cooler generally indicated by the reference numeral 33, and a heat exchanger generally indicated by the reference numeral 34. Thus, there extends from the upper chamber 20 in the auxiliary cylinder 12, from the valve 29, a conduit 35, a portion 36 of which passes through a heated zone 37 in the gas heater 32 and is then connected to the valve 23 in the upper chamber 10 in the master cylinder 1. In a similar manner, a conduit 38 is connected to the valve 26 of the lower chamber 11 in the master cylinder 1, a portion 39 of the conduit 38 passing through a cold zone 40 in the gas cooler 33 and then connected to the valve 30 in the lower chamber 21 of the auxiliary cylinder 12.

The heat exchanger 34 has two chambers 41, 42, which are separated from each other so as to be gas tight, partition walls being arranged in a manner such that good heat transmission is obtained from the chamber 41 to the chamber 42. The top of the chamber 41 is connected via a conduit 43, with the valve 24 in the upper chamber 10 of the master cylinder 1, while the lower end of the chamber is connected, via a conduit 44, to the valve 25 in the lower chamber 11 of the master cylinder 1. In a corresponding manner, the top of the chamber 42 is connected via a conduit 45, to the valve 28 of the upper auxiliary chamber 20 while the lower end of the chamber is connected, via a conduit 46, to the valve 31 in the lower auxiliary cylinder chamber 21.

It is assumed for the operation of the heat engine that energy in the form of heat is continuously supplied to the gas heater 32 in a manner such that the temperature in the heated zone 37 is maintained at a constant level or is adjusted to the power output of the engine. Further, the gas cooler 33 should be so arranged that absorbed heat is continuously removed through, for example, water cooling. With respect to both the gas heater 32 and the gas cooler 33, the transmission of heat from the heated zone 37 in the gas heater 32 to the working gas and the transmission of heat from the working gas to the cold zone 40 in the gas cooler 33 should be as effective as possible. In practice, this means that the conduit portion 36 passing through the hot zone 37 and the conduit portion 39 passing through the cold zone 40 should have wide contact surfaces facing towards the working gas and the heated zone 37 and the cold zone 40, since heat transfer in the gas heater 32 and the gas cooler 33 is effected substantially through convection. In certain instances it may be to advantage to supply heat to the upper chambers of respective cylinders and to cool the lower chambers in order to bring them to a temperature favourable to the operation sequence. As will be evident from the drawings, to provide for heat insulation the pistons in the master and auxiliary cylinders have been given a relatively long extension.

In the following description of the mode of operation of heat engine reference is made to FIGS. 1, 2 and 3. It is assumed that the crankshaft 9 and the crank elbows 8, 19 rotate in the direction indicated by the arrows P1. In FIG. 1, the illustrated position and movement directions of the master piston 2 and the auxiliary piston 13 correspond to a working phase of the engine, hot gas curing expansion in the upper chamber 10 forcing the master piston 2 down to a bottom position corresponding to a bottom-dead-centre position for the crank elbow 8. At the same time, the auxiliary piston 13 moves upwards to an upper position corresponding to a top-dead-centre position for the crank elbow 19, whereupon requisite displacement is obtained of the working gas during compression thereof between the lower chambers 11 and 21.

FIG. 2 illustrates positions and movement directions of the master piston 2 and auxiliary piston 13 which correspond to a heat-exchange phase, the piston 2 moving to an upper position corresponding to a top-dead-centre position of the crank elbow 8 and the piston 13 moves down to a lower position corresponding to a bottom-dead-centre position of the crank elbow 19. During this movement cycle, the previously expanded gas in the chamber 10 is forced out at the same time as the piston 13 produces the requisite displacement of the working gas. It will be understood that the mentioned relative angular displacement of roughly 180° between the crank elbows 8 and 19 cause reverse congruent movements of the piston 2 and the piston 13 so that both reach the top-dead-centre and bottom-dead-centre positions simultaneously. It will also be clear that the work required for moving the pistons 2 and 13 with associated components in an engine having only two cylinders must be supplied from a co-rotating mass, for example a fly-wheel (not shown) mounted on the crank-shaft 9.

At the beginning of the working phase (FIG. 1) the master piston 2 is in a top-dead-centre position while the auxiliary piston 13 is in a bottom-dead-centre position. The upper chamber 20 in the auxiliary cylinder 12 is filled with the gas pre-heated by the heat exchanger 34. The valves of the upper chamber 20 are set so that the valve 28 is closed and the valve 29 is open. The valves in the upper chamber of the master cylinder 1 are set so that the valve 23 is open and the valve 24 is closed. Reversal of the valve positions takes place at that moment when the master piston 2 and the auxiliary piston 13 are located at the top-dead-centre position and bottom-dead-centre position respectively. Upon upward movement of the auxiliary piston 13, gas is forced from the chamber 20, as indicated by the arrows P4, via the valve 29 and the conduit 35 and the conduit portion 36 through the gas heater 32 and is heated. As shown by the arrows P5, the gas then flows, via the valve 23, into the upper chamber 10, where it expands, delivering extra work which forces the piston 2 downwards.

The lower valves of the master cylinder 1 and the auxiliary cylinder 12 are adjusted so that the valve 25 is closed, the valve 26 is initially open, the valve 30 is open and the valve 31 is closed. The gas located in the chamber 11 and originating from an immediately preceding working phase is compressed by the downward movement of the master piston and when the pressure equals the pressure in the conduit 38 the valve 26 opens and the gas flows therethrough, as indicated by the arrows P6, via the valve 26 through the conduit 38 and the conduit portion 39, through the gas cooler 33 where a reduction in temperature takes place before the gas flows, via the valve 30, into the lower chamber 21. Because of the aforementioned difference in size and area of the master piston and the auxiliary piston 12, the gas is compressed as it is displaced from the chamber 11 to the chamber 21, the heat produced by said compression being conducted away through the gas cooler 33.

Upon completion of the working phase, the piston 2 occupies a bottom-dead-centre position and the piston 13 occupies a top-dead-centre position. In this position, the direction of movement of the pistons is reversed, as shown by the arrows P7 and P8 resp. in FIG. 2. Simultaneously, the valves are also reversed so that previously open valves 26, 29, 30 are closed — valve 23 is closed just before the dead-centre position is reached — and previously closed valves 24, 25, 28 are opened, the valve 31 remaining closed at that moment. This means that all gas communication with the gas heater 32 and the gas cooler 33 is closed and that communication with the heat exchanger 34 is opened instead. The gas in the chamber 10 expands as shown by the arrows P9, via the valve 24 and the conduit 43 through the chamber 41 in the heat exchanger, where it is cooled, and continues through the conduit 44 via the valve 25 into the lower chamber 11.

Simultaneously herewith the cooled gas which has filled the lower chamber 21 during the aforedescribed working phase is compressed upon continued rotation of the crankshaft 9 to the same pressure as the gas pressure in the conduit 46, whereafter the valve 31 is opened and the gas flows, as shown by the arrows P10, via the valve 31 and the conduit 46 through the chamber 42 in the heat exchanger 34. During compression of the gas in chamber 21, the gas in the chamber 42 is heated and expands as a result of an exchange of heat from the chamber 41 to the chamber 42, an additional force being obtained in piston 13 during the compression. Thus, after the valve 31 is opened the expanded but still hot gas passes in the heat exchanger 34, according to the counter-flow principle, from the cylinder 1 past the cooled gas from the cylinder 12. Displacement of the two bodies of gas takes place while maintaining a substantially constant gas volume and an effective exchange of heat takes place between the gas bodies, so that the gas in the master cylinder 1 when it reaches the chamber 11 is greatly cooled and the gas in the auxiliary cylinder when it reaches the upper chamber 20 is strongly heated. When the piston 2 has reached its top-dead-centre position and the piston 13 has reached its bottom-dead-centre position, displacement of the gas bodies is complete and a new working phase commences as a reversal of the positions of all valves takes place.

It will readily be perceived that the conversion of energy at each working cycle is determined by the quantity of working gas, i.e., with the closed system of the present invention by the pressure of the working gas and the increase in temperature of the gas during its passage through the gas heater 32. The engine power at a given degree of energy conversion for each working cycle is obviously dependent on the speed of the engine, which in turn is determined by the structural dimensioning of the movable components and the conduits, valves and other components.

The thermodynamical efficiency is determined to a decisive extent by the effectiveness of the heat exchanger 34 and insulation (not shown) of the hot parts of the engine from which heat is liable to be lost.

The alternative embodiment illustrated in FIG. 3 conforms with the embodiment of FIGS. 1, 2 with the exception that a portion 44' of the conduit 44 is extended and constructed for cooling the gas which passes through the conduit 44, the portion 44' being arranged in an extra or alternatively separate portion 40' of the cold zone 40 in the gas cooler 33. Further a portion 45' of the conduit 45 is extended and for heat transfer purposes constructed as a heating zone 37' which is either coherent with the heating zone 37 in the gas chamber 32 or separate therefrom.

With the alternative embodiment illustrated in FIG. 3 the gas which is expanded during the exhuast phase and extends from the upper chamber 10 in the master cylinder 1 through the heat exchanger 34 to the lower chamber 11 in the master cylinder is further cooled during its passage through a portion 44' of the conduit 44. The portion 44' can be arranged in a cold zone 40' which may comprise a portion of the cold zone 40 in the gas cooler 33 or which may also form a separate cooling unit.

Figure 4:
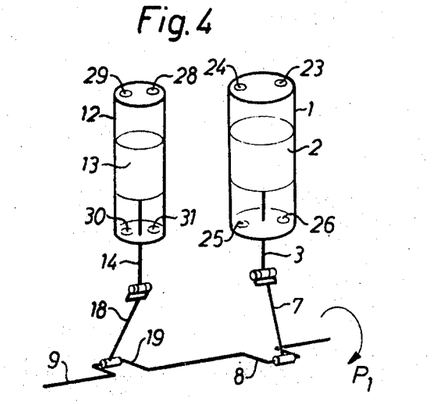
FIG. 4 illustrates diagrammatically and in perspective a mutual angular position of the connecting rods of respective pistons in the engine illustrated in FIGS. 1,2.
Figure 5:
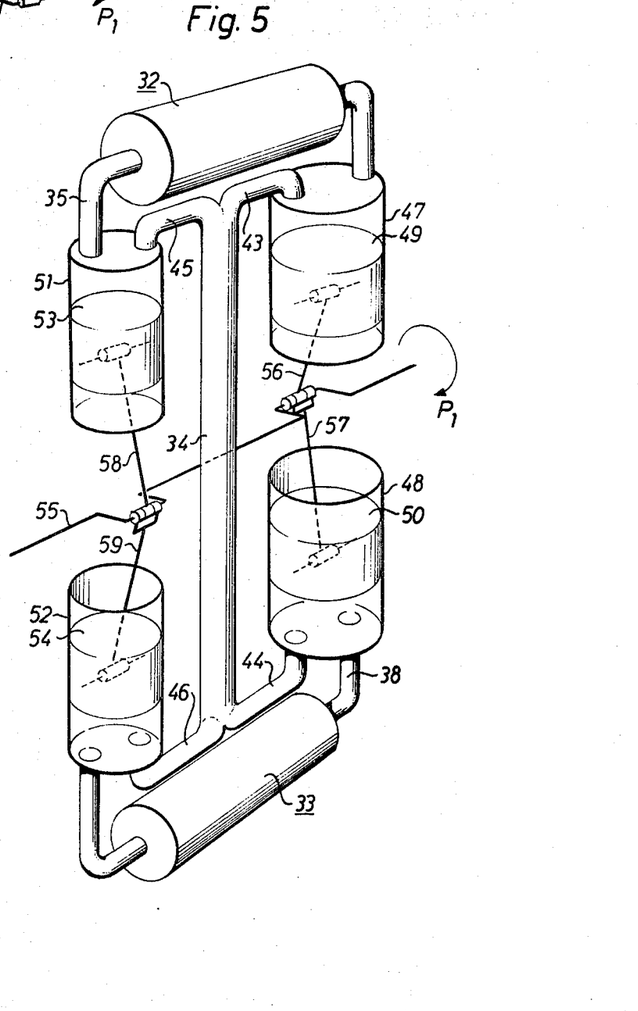
FIG. 5 illustrates diagrammatically and in perspective an alternative embodiment of the heat engine according to the invention, having a pair of single-acting master cylinders provided with pistons and auxiliary cylinders provided with pistons arranged on a common crank shaft.

Simultaneously herewith and analogously hereto the gas which is expanded and extends from the lower chamber 21 via the heat exchanger 34 to the upper chamber 20 in the auxiliary cylinder 11 may be subjected to an extra heating step. This extra heating is effected in a portion 45' of the conduit 45, the portion 45' passing through a heated zone 37', which may either comprise a portion of the hot zone 37 in the gas heater 32 or may also form a separate unit. By means of this arrangement, the working gas is subjected to an extra cooling and an extra heating step, which contributes to increasing the termodynamic efficiency and degree of energy conversion for each working cycle. It is obvious that at certain embodiments it is possible to use either a cold zone 40' or a heated zone 37'. With higher power outputs per cylinder volume and faster engines it is necessary to operate at a sufficiently high super or overpressure on the gas enclosed in the engine and simultaneously provide effective seals for pistons, piston rods and valves. Present day engineering is able to provide reliable solutions for the latter. For the purpose of solving the sealing problem for piston rods of an embodiment of the engine illustrated in FIGS. 1, 2, however, there is shown in FIG. 5 an alternative embodiment having two axially opposed single-acting master cylinders 47,48 provided with two pistons 49,50, and two axially opposed single acting auxiliary cylinders 51,52 provided with two pistons 53,54. The pistons are connected directly to a crankshaft 55 through connecting rods 56–58 in a known manner without intermediate piston rods. The alternative embodiment of FIG. 4 provides a simplified construction in the present context, which can be applied to advantage to special embodiments of the engine.

As previously mentioned, certain valves need not be positively controlled, but can be actuated solely by the pressure of the gas. This is true of the valves 25, 26,29,30,31 of the embodiment shown in FIGS. 1,2, while the valves 23,24,28 shall be positively controlled.

The valves 25,26,29,30 and 31 may thus comprise non-return valves. This will readily be perceived when studying the working cycle. The valve 25 shall be held closed when an overpressure prevails in the lower chamber 11, i.e., during the expansion stroke, and is opened when an over-pressure prevails in the conduit 44 during the heatexchange stroke. The valve 26 shall be held closed against an overpressure in the conduit 38, i.e., during the heat-exchange stroke, but is opened when the pressure in the lower chamber 11 during the expansion stroke exceeds the pressure in the conduit 38. The valve 29 shall be held closed against overpressure in the conduit 35 during the heat-exchange stroke, but shall be open when an overpressure prevails in the upper chamber 20 in the auxiliary cylinder during the expansion stroke. It should be mentioned, however, that the valve 29 can be omitted entirely. As previously mentioned, during the expansion stroke there is gas communication between the chambers 10 and 20 in the master and auxiliary cylinder respectively, i.e., the valves 29 and 23 are open. It has also been mentioned that the valves 23 and 29 are closed during the heat-exchange stroke. It is also to advantage, however, if the valve 29 is open during this phase, since in this way the overpressure formed by heating the gas in the conduit 35,36 can then be used to actuate the piston 13 over at least a portion of the heat-exchange stroke. Thus, it is not necessary to regulate or control the connection between the chamber 20 and the conduit 35.

In this connection it can be mentioned that at the beginning of the heat-exchange stroke, when hot gas expands into the heat-exchanger chamber 41 from the upper auxiliary cylinder chamber 10, the gas in chamber 42 also expands as a result of an exchange of heat, which also actively contributes to forcing down the piston 13 in the auxiliary cylinder.

Regarding the valves 30 and 31, the valve 30 shall be closed against overpressure in the chamber 21, and open when an overpressure prevails in the conduit 38,39; the valve 31 being open when an overpressure prevails in the chamber 21 and closed with overpressure prevailing in the conduit 46.

A system is conceivable with which the valves 25, 26,29,30 and 31 are controlled by servo-devices which regulate in response to pressure differences in respective cylinder chambers and/or conduits.

It has also been mentioned in the aforegoing that the heat exchanger 34 should work at a high rate of efficiency. The exchange of heat between bodies is a well developed technique and many solutions are available.

Figure 6:
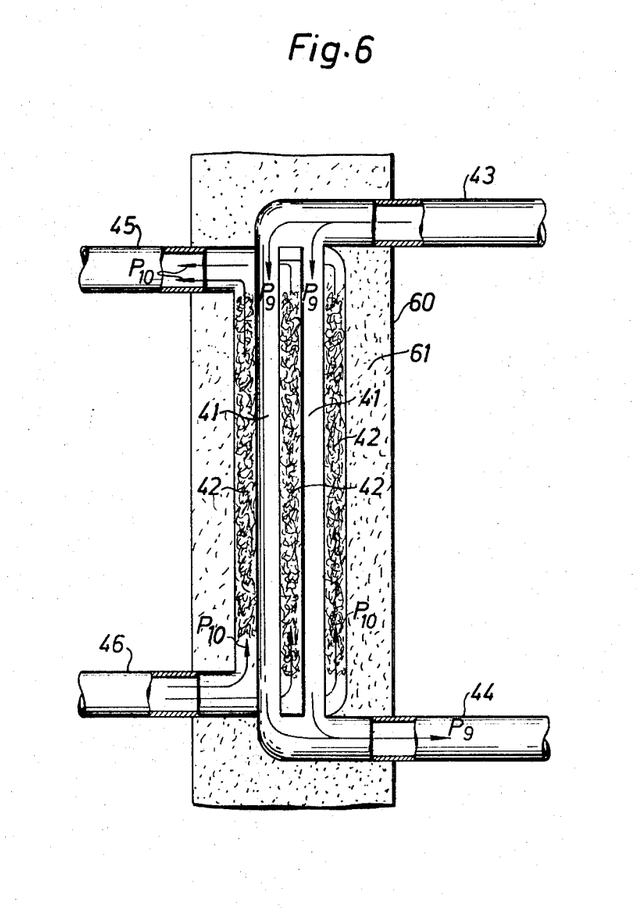
FIG. 6 illustrates an example of a heat exchanger used with the heat engine illustrated in FIGS. 1–5.

FIG. 6 illustrates an advantageous embodiment of a counter-flow heat exchanger, the same reference numerals and arrows for the flow directions being used as those in FIGS. 1 and 2 for like details. In order to provide for the highest possible heat exchange effect between the hot gas flowing through the conduit and the cold gas flowing in through the conduit 46 it is suitable to arrange in one or both of the chambers 41,42 a certain quantity of a highly porous, effective heat conducting material, for example copper wire wool or some other metal wool. FIG. 6 also illustrates an insulating casing 60 provided with a highly effective insulating body 61, which fully encloses the heat exchanger 34 and reduces the external heat losses to a minimum. The heat-exchanger heater and cooler can, in certain instances, be common to several cylinders.

It will readily be perceived that a heat engine of the aforedescribed type can be converted directly to a heat pump or a refrigerating machine by supplying mechanical work by means of driving the crankshaft 9, FIGS. 1–3. The working gas then transports heat from the gas heater 32 to the gas cooler 33, which means that the gas heater in this instance may function, for example, as a cooling coil. The heat absorbed by the cooling coil must then be removed from the gas cooler 33 in a known manner. In case a device above described shall be used as a cooling machine, i.e., as a heat pump, the valve functions at e.g., the machine shown in FIG. 1 and 2 may be as follows. The valves 23, 24 in the upper master cylinder chamber 10 may suitably be constituted by single-path valves which is also the case of the valves 25, 26 in the lower master cylinder chamber 11 as well as the valves 28, 29 in the upper auxiliary cylinder chamber 20. However, the valves 30 and 31 in the lower auxiliary cylinder chamber 21 shall be positively controlled by the piston movements. By driving the device by means of the shaft 9 a heat pump is thus obtained.

Even when provided with effective seals for the valve mechanism piston rods etc. unavoidable gas losses due to leakage are experienced with an engine or a refrigerating machine of the type described. The engine should therefore be provided with supply means (not shown) for successively replacing the gas lost. Such supply means are also suitable in view of the changes in gas pressure which can be desirable when varying the energy conversion degree.

The present invention has been described and illustrated in the aforegoing with respect to an engine having only one working phase per revolution. The concept of the invention, however, can also be applied to an engine having two or more pairs of master cylinders and auxiliary cylinders arranged on a common crankshaft whose crank elbows are arranged in such mutual angular relationship that the torque on the crankshaft is distributed as evenly as possible over the whole crankshaft revolution. In this way the engine can be made self starting in all crank shaft positions and the mass of the previously mentioned fly wheel can be recuded.

What I claim is:

1. A gas operated heat engine or heat pump having at least one pair of cylinders including a master cylinder having a master piston associated therewith and an auxiliary cylinder having an auxiliary piston associated therewith, and connecting lines arranged between the cylinders such that the gas circulates in a system having a gas heater and a gas cooler, characterized in that the master cylinder has a larger stroke volume than the associated auxiliary cylinder, and that during a working phase an upper auxiliary cylinder chamber in the auxiliary cylinder communicates via the gas heater with an upper master cylinder chamber in the master cylinder, and at the same time a lower master cylinder chamber in the master cylinder communicates via the gas cooler with a lower auxiliary cylinder chamber in the auxiliary cylinder, and that during a heat-exchange phase of the master cylinder, immediately after the working phase, the upper chamber in the master cylinder communicates via a first side of a heat exchanger with the lower chamber in the master cylinder, while at the same time the lower chamber in the master cylinder communicates via a second side of said heat exchanger with the upper auxiliary cylinder chamber in the auxiliary cylinder.

2. A heat engine according to claim 1, characterized in that the master piston and auxiliary piston of each pair of cylinders are so connected to each other that their movement phases lies roughly 180° displaced in relation to each other.

3. A heat engine according to claim 2, characterized in that the gas flow to and from respective chambers is controlled by valves which are positively controlled synchronously for the movement phases of the pistons.

4. A heat engine according to claim 1, characterized in that the upper chamber of the master cylinder includes two valves which are positively controlled synchronously with respective piston movements and that one valve is placed in connection with the gas heater and the other is placed in connection with the heat exchanger, the lower chamber of the master cylinder also including two valves which comprise single-path valves one of which is placed in connection with the heat exchanger and the other of which is placed in connection with the gas cooler, and that the upper chamber of the auxiliary cylinder includes two single-path valves of which one is placed in connection with the heat exchanger while the other valve is placed in connection with the gas heater, the lower chamber of the auxiliary cylinder including two single-path valves, one being in connection with the gas cooler and the other being in connection with the heat exchanger.

5. A heat engine according to claim 2, characterized in that the upper chamber of the master cylinder includes two valves which are positively controlled synchronously with respective piston movements and one of which is placed in connection with the gas heater and the other is placed in connection with the heat exchanger, the lower chamber of the master cylinder also including two valves placed in connection with the heat exchanger and the gas cooler respectively and comprising servo-controlled valves controlled in response to pressure differences in respective cylinder chambers and/or connected conduits, and that the upper chamber of the auxiliary cylinder includes two valves of which one is placed in connection with the heat exchanger while the other valve is placed in connection with the gas heater, one or both valves being servo-controlled valves controlled in response to pressure conditions in respective cylinder chambers and/or connected conduits, the lower chamber of the auxiliary cylinder including two valves of which one is connected with the gas cooler and the other of which is connected with the heat exchanger, which last mentioned valves comprise servo-controlled valves controlled in response of the pressure conditions in respective cylinder chambers and/or connected conduits.

6. A heat engine according to claim 1, characterized in that free gas communication prevails between the gas heater and the upper chamber of the auxiliary cylinder.

7. A heat engine according to claim 1, characterized in that gas moved from the upper chamber in the auxiliary cylinder to the upper chamber in the master cylinder during the working phase is continuously heated in the gas heater.

8. A heat engine according to claim 1, characterized in that gas moved from the lower chamber in the master cylinder to the lower chamber in the auxiliary cylinder during the working phase is continuously cooled in the gas cooler.

9. A heat engine according to claim 1, characterized in that the heat exchange in the heat exchanger takes place under substantially constant volume of the gas moved during the heat exchange phase from the upper chamber to the lower chamber in the master cylinder and from the lower chamber to the upper chamber in the auxiliary cylinder.

10. A heat engine according to claim 1, characterized in that the gas from the upper chamber in the master cylinder, subsequent to passing to the heat exchanger and prior to entering the lower chamber in the master cylinder, passes through a gas cooling portion and/or in the same heat exchange phase the gas from the lower chamber in the auxiliary cylinder, subsequent to passing through the heat exchanger and prior to entering the upper chamber in the auxiliary cylinder, passes through a gas heating portion.

11. A heat engine according to claim 1, characterized in that the gas heater and/or the gas cooler and/or the heat exchanger may be common to two or more pairs of cylinders in an engine.

12. A heat engine according to claim 1, characterized in that the main cylinder includes two coaxially arranged cylinder portions which open towards each other and which have pistons in each cylinder portion, and that the auxiliary system includes two cylinder portions having a piston in each cylinder portion, the master cylinder pistons and the auxiliary cylinder pistons being mutually, and relatively to each other, mechanically connected so that a translatory piston movement having a phase displacement of roughly 180° between the master cylinder pistons and the auxiliary cylinder pistons is obtained.

13. A heat engine according to claim 1, characterized in that the pistons embodied in the engine have a relatively long extension in respective cylinders to provide for heat insulation.

14. A heat pump according to claim 1, characterized in that the upper master cylinder chamber includes two single-path valves, one placed in the connection with the gas heater and the other in the connection with the heat exchanger, the lower master cylinder chamber also including two single-path valves, one placed in the connection with the heat exchanger and the other in the connection with the gas cooler, and that the upper auxiliary cylinder chamber includes two single-path valves one of which is placed in the connection with the heat exchanger and the other is placed in the connection with the gas heater, the lower axiliary cylinder ceamber including two valves which are positively controlled by the piston movements one of which valves is placed in the connection with the gas cooler and the other of which is placed in the connection with the heat exchanger.

* * * * *

UNITED STATES PATENT OFFICE
CERTIFICATE OF CORRECTION

Patent No. 3 751 904          Dated August 14, 1973

Inventor(s) Sigge Rydberg

It is certified that error appears in the above-identified patent and that said Letters Patent are hereby corrected as shown below:

In the Abstract, line 18; change "master" to ---auxiliary---

Column 2, line 26; change "master" to ---auxiliary---.

Column 9, line 25; change "master" to ---auxiliary---.

Column 12, line 2; change "ceamber" to ---chamber---.

Signed and sealed this 12th day of November 1974.

(SEAL)
Attest:

McCOY M. GIBSON JR.            C. MARSHALL DANN
Attesting Officer              Commissioner of Patents